United States Patent [19]

Sundahl

[11] 4,140,368

[45] Feb. 20, 1979

[54] IN-LINE REVOLVING SAFETY REFLECTOR ASSEMBLY

[76] Inventor: Edwin G. Sundahl, 408 Sherman St., Downers Grove, Ill. 60515

[21] Appl. No.: 795,168

[22] Filed: May 9, 1977

[51] Int. Cl.² .............................................. G02B 5/12
[52] U.S. Cl. ................... 350/99; 301/37 SA; 350/97
[58] Field of Search .................. 301/37 SA, 37 R; 350/99, 97, 102–105; 280/149 A; D10/111; 204/19

[56] References Cited

U.S. PATENT DOCUMENTS

| 3,781,082 | 12/1973 | Lindner | 350/99 |
| 3,809,434 | 5/1974 | Lindner | 350/99 |
| 3,894,786 | 7/1975 | Nagel | 350/99 |
| 3,895,855 | 7/1975 | Nagel | 350/99 |
| 3,947,070 | 3/1976 | Brilando et al. | 350/105 |
| 3,960,437 | 6/1976 | Von Heck | 350/99 |
| 4,037,924 | 7/1977 | May | 350/99 |

FOREIGN PATENT DOCUMENTS 657587  3/1929  France ...................................... 350/106

Primary Examiner—John K. Corbin
Assistant Examiner—B. W. de los Reyes
Attorney, Agent, or Firm—George H. Lee

[57] ABSTRACT

An in-line safety reflector assembly for attachment to a spoked wheel of a cycle for improved end visibility of the cycle. Two planar reflectors are attached to opposite sides of a spring metal base plate, the inner end of which has a curved portion forming a spring clip for attachment to the wheel hub and the outer end of which has a laterally protruding spoke clamp which can be crimped onto a spoke. The reflectors lie in a plane parallel to the hub axis, lie wholly within the protected space generated by the revolving spokes, and have an extensive surface area, extending substantially the entire width of such space and the major portion of the length thereof.

8 Claims, 6 Drawing Figures

IN-LINE REVOLVING SAFETY REFLECTOR ASSEMBLY

BACKGROUND OF THE INVENTION

The continuing high incidence of night time traffic accidents involving bicycles or motorcycles being struck by a motor vehicle approaching from the front or rear attests to the need for improvements in in-line (end-viewable) safety reflectors for cycles. In general it can be stated that presently available in-line reflector assemblies leave much to be desired in the way of economy of manufacture, ease of installation, ability to withstand prolonged usage without damage, and high visibility under all riding conditions. More particularly, in order to provide sufficient visibility, it has generally been thought desirable in the prior art to mount in-line reflectors at least partially to the outside of the wheel spokes, such as disclosed in U.S. Pat. No. 3,895,855 for End-Viewable, Spoke-Mountable Reflector, issued July 22, 1975 to Robert L. Nagel. In such exposed position, they are highly vulnerable to being struck and knocked off or damaged.

SUMMARY OF THE INVENTION

I have discovered that if the in-line reflector assembly is otherwise properly designed, it can be mounted so as to lie wholly within the internal protected space generated by the revolving spokes, and still be highly visible even directly from the front and rear under the various riding conditions encountered. Because of the inherent structural looseness, wheel asymmetry, and dynamic instability of a cycle, a relatively large and properly mounted reflector, even though lying wholly within the spoke protected space, will never be completely screened from end view by the intervening cycle structure, such as mudguard and frame, but rather will be screened from end view only in a very partial, momentary, and random manner. It will be appreciated that in an operating cycle, small changes are continuously occurring in respect to the steering angle between front wheel and rear wheel, and in respect to the angles from the vertical of the two wheels and the cycle as a whole. Further, the inherent minor asymmetry of the wheels, the inherent play of the wheels on their axes, and the normal bouncing of the wheels all play their part in causing a continuous random movement of any wheel mounted reflector.

To take advantage of these cycle characteristics, a relatively large planar reflector is mounted within the protected space defined by the cycle spokes and in a plane parallel to the hub axis. Such placement of the reflector is best obtained by attaching the radially inner end of the reflector to the hub and attaching the radially outer end of the reflector to a spoke. Preferably, the reflector is mounted on a spring metal base plate which is shaped at its inner end to be snapped on to the hub and at its outer end to be pinch clamped on to a spoke. To double the effectiveness, two reflectors are preferably mounted on opposite sides of the base plate. To provide an extensive reflecting surface area, the reflector preferably occupies a major portion of the generally trapezoidal shaped area formed by the intersection of the plane of the reflector with the internal spoke protected space and preferably extends substantially the entire distance laterally across said space. Thus, the reflector is preferably generally trapezoidal shaped to conform to the shape of the protected space and preferably extends radially outwardly a major portion of the distance from the hub to the rim.

In a modified dual form of the invention, two of the aforesaid reflector assemblies are effectively joined back to back so that they lie on opposite sides of the hub. In this case, the spring metal base plate is provided with two reflector supporting legs which, in their unstressed state, form an obtuse angle with respect to each other. The legs are joined by a hub engaging intermediate portion so that the legs can be straightened out and attached by spoke clamps to 180° opposed spokes. Preferably, the intermediate portion has a curved portion forming a spring clip which can be snapped on to the hub to support the assembly while the legs are being straightened out and clamped.

DETAILED DESCRIPTION

Figure 1:
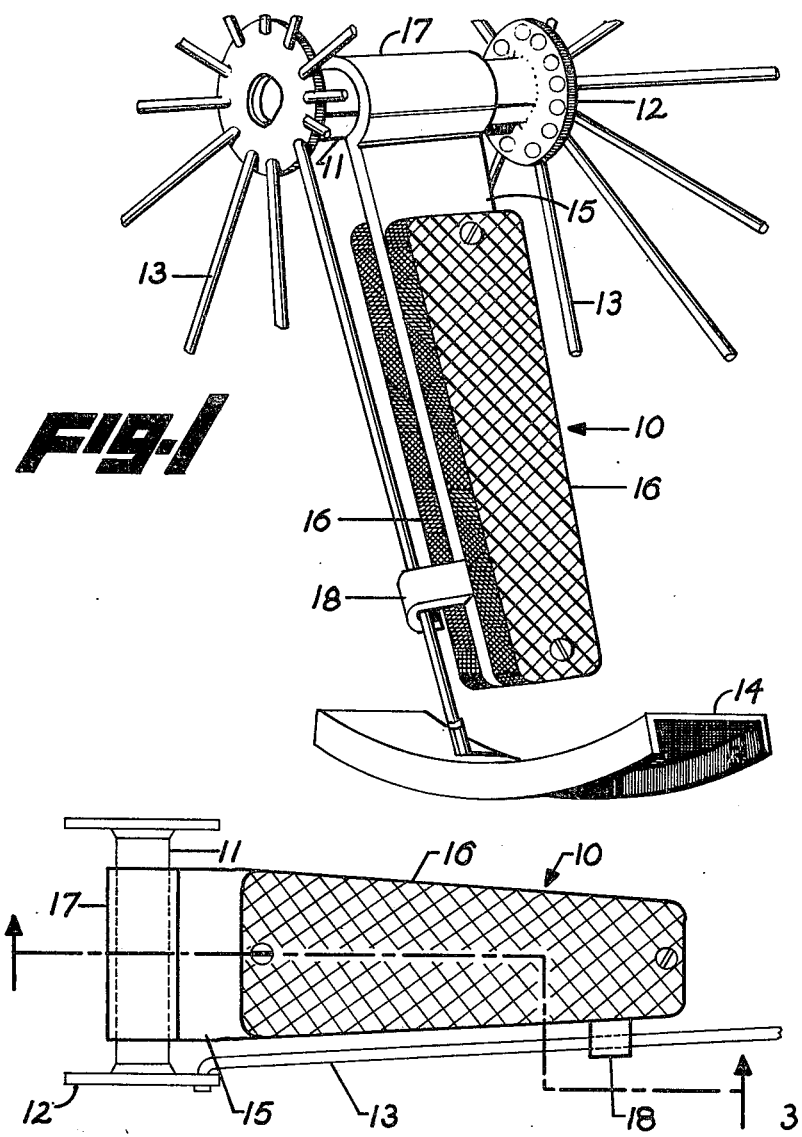
FIG. 1 is a perspective view showing the reflector assembly of the present invention attached to a spoked cycle wheel.
Figure 2:
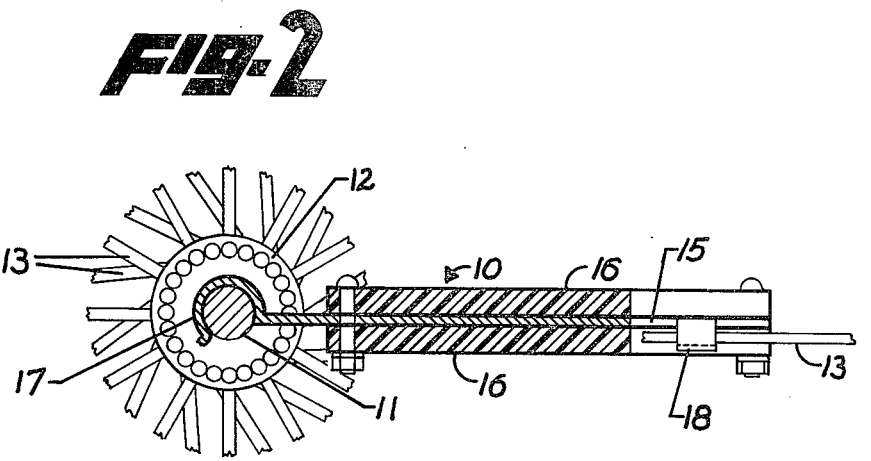
FIG. 2 is a plan view of the apparatus of FIG. 1.
Figure 3:
FIG. 3 is a sectional view taken along the lines 3—3 of FIG. 2.

Referring now to FIGS. 1-3, reference numeral 10 designates generally the reflector assembly of the present invention. Portions of a conventional spoked cycle wheel to which it is attached are also shown, including a center hub 11, hub flanges 12, spokes 13 and rim 14.

The reflector assembly 10 consists of a spring metal base plate 15 supporting two generally flat or planar reflectors 16 on opposite sides thereof. The reflectors 16 are preferably of the retroreflecting type such that substantially all of incident light striking the reflecting surface at angles up to about thirty degrees on either side of the normal is reflected back to the light source. As is known, the reflectors can be formed of glass or plastic or even of a surface layer of reflecting tape or particles.

The inner end of base plate 15 is formed as a curved portion 17 shaped to conform generally to the hub 11 of the wheel to which the reflector assembly is to be attached but having an opening slightly smaller than the diameter of the hub. The curved portion 17 thus forms a spring clip by which the reflector assembly can be very easily clipped onto the hub, as shown.

In order to support the reflector assembly at its outer end and to keep it from rotating about the hub, base plate 15 has formed at one side near its outer end a laterally protruding spoke clamp 18 adapted to engage any one of the spokes. If desired, the spoke clamp may have an opening somewhat smaller than the spoke diameter so that it may be snapped on the spoke in the manner of clip 17. In any event, the spoke clamp 18 may be pinched or crimped with a pair of pliers, for example, to positively affix the reflector assembly in place on the wheel.

It should be noted particularly that with the above described unique construction and mounting means the reflector lies wholly within the internal protected space which is generated by the spokes as the wheel revolves. In marked contrast to certain in-line reflectors of the prior art, no part of applicant's reflector assembly protrudes out beyond the spokes into unprotected space where it would be subject to being knocked off or damaged. Further, with applicant's unique design of mounting means, the reflector lies in a plane which is parallel to the axis of hub 11 so that maximum in-line retroreflection to the front and rear is obtained.

It is desirable to maximize the area of reflector viewable from the front and from the rear under various riding conditions, not only to maximize the total amount of reflection but also to maximize the variety of riding conditions under which reflection will occur. Accordingly, the reflectors 16 are preferably tapered as they extend radially outwardly and are preferably shaped generally to conform to at least the inner portion of the generally trapezoidal shaped area formed by the intersection of the plane of the reflectors and the aforesaid protected space generated by the spokes. Preferably the reflectors 16 extend substantially all the way across said trapazoidal shaped area from one side to the other and preferably they extend radially outward far enough to occupy a major portion of the entire available trapezoidal shaped area.

It will be apparent that as the wheel rotates, each of the two reflectors 16 will reflect twice in each revolution, once to the rear and once to the front. The assembly of the two reflectors therefore will reflect light from the rear twice per revolution at two vertically displaced points, and it will also reflect light from the front twice per revolution at two vertically displaced points, thereby providing an attention getting intermittently flashing flip-flop effect.

It will be understood that conventional side reflectors will normally also be used with the revolving in-line reflectors of the present invention.

Figure 4:
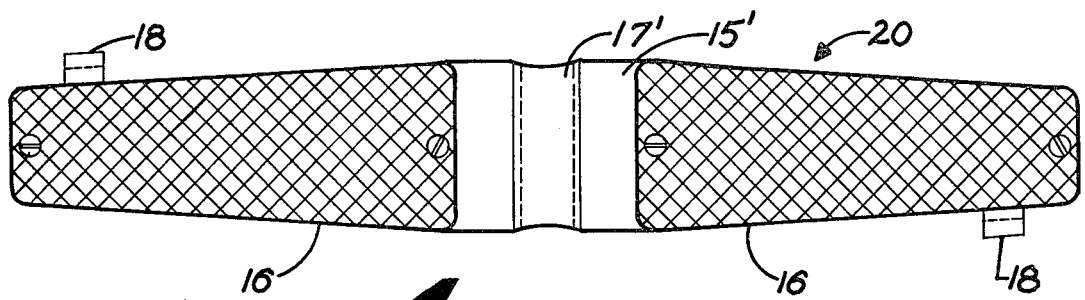
FIG. 4 is a plan view of the dual reflector assembly of the present invention in its normal unstressed state.
Figure 5:
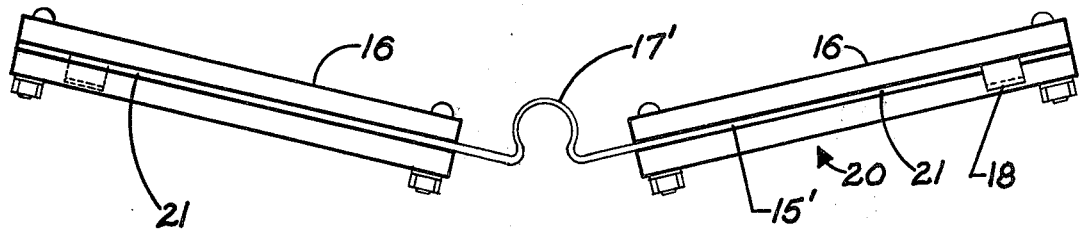
FIG. 5 is a side elevation view of the dual reflector assembly of FIG. 4.
Figure 6:
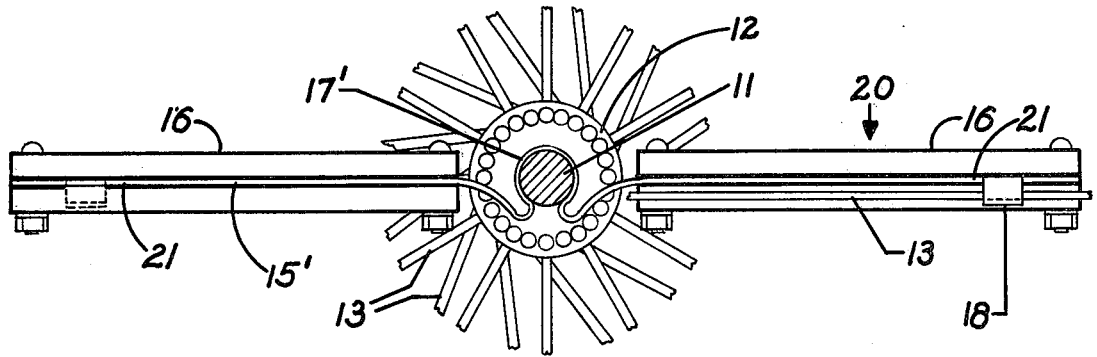
FIG. 6 is a side elevation view showing the dual reflector assembly as it appears in its stressed state attached to a cycle wheel.

In FIGS. 4–6, there is illustrated a dual reflector assembly modification of the invention which, in one unitary assembly, effectively provides two of the reflector assemblies 10 of FIGS. 1–3.

Referring now to FIGS. 4–6, the dual reflector assembly designated generally at 20 can, in a general way, be thought of as constituting two of the reflector assemblies 10 of FIGS. 1–3 joined back to back at their wider inner ends. Thus spring metal base plate 15' in this case has two oppositely extending legs 21 each of which support two generally trapezoidal shaped reflectors 16 identical to those of FIGS. 1–3. Each base plate leg 21 is provided with a spoke clamp 18 on opposite sides as shown. In the normal unstressed state of base plate 15', the legs 21 form an obtuse angle with one another, as shown in FIG. 5. An intermediate curved portion 17' of base plate 15' is adapted to bear against the hub 11 as the two legs 21 are manually pulled out to their straight position (FIG. 6) and restrained in that position by spoke clamps 18. Preferably, the intermediate portion 17' of base plate 15' is shaped to conform generally to the wheel hub but to have an opening of a slightly smaller diameter than that of said wheel hub so the entire assembly may be snapped on the wheel hub and supported thereby while its legs 21 are being straightened out and clamped to the spokes.

It will be apparent from the foregoing that I have provided improved in-line safety reflector assemblies which can be manufactured with relative ease and economy; which can be easily and positively on a cycle; which are rugged and resistive to damage under prolonged usage; which maximize the variety of riding conditions under which reflections occur; and which maximize the amount of reflected light.

Other and further embodiments and variations of the present invention will become apparent to those skilled in the art from a reading of the present specification taken together with the drawings, and no undue limitations are to be inferred from the present disclosure

I claim:

1. An in-line (end-viewable) reflector assembly for attachment to a cycle wheel having a central hub, a radially spaced rim, and a plurality of spokes converging from opposite sides of the hub to the rim to provide the support for the rim, comprising a generally planar reflector, and mounting means for attaching said reflector to said wheel to lie wholly within the internal protected space generated by the spokes of said wheel and in a plane parallel to the hub axis, said mounting means comprising means for attaching the radially outer end of said reflector to a spoke of the wheel and means for attaching the radially inner end of said reflector to the hub of said wheel, said means for attaching the radially inner end of said reflector to the hub of said wheel comprising a base plate supporting said reflector, said base plate having at its inner end a curved portion conforming generally to said wheel hub but having an opening slightly smaller than the diameter of said wheel hub, to thereby form a spring clip adapted to be snapped over said hub to restrain said base plate from movement radially of the wheel, and said means for attaching the radially outer end of said reflector to a spoke of the wheel comprising a laterally protruding spoke clamp at its radially outer end adapted to be clamped to a spoke to restrain said base plate from movement circumferentially of the wheel.

2. An in-line (end-viewable) reflector assembly for attachment to a cycle wheel having a central hub, a radially spaced rim, and a plurality of spokes converging from opposite sides of the hub to the rim to provide the support for the rim, comprising two generally planar reflectors, and mounting means for attaching said reflectors to said wheel to lie wholly within the internal protected space generated by the spokes of said wheel and in a plane parallel to the hub axis, said mounting means comprising means for attaching the radially outer end of said reflectors to a spoke of the wheel and means for attaching the radially inner end of said reflectors to the hub of said wheel, said mounting means comprising a spring metal base plate supporting said reflectors at opposite ends thereof, said base plate having an intermediate portion adapted to bear against the hub of said wheel, said mounting means also comprising laterally protruding spoke clamps at its radially opposite ends, the said base plate having a normal unstressed position in which its said two ends form an obtuse angle and being adapted to be stressed to a straight position and retained in said straight position by attachment of said spoke clamps to 180° opposed spokes.

3. The assembly of claim 2 wherein said intermediate portion of said base plate has a curved portion conforming generally to said wheel hub but having an opening slightly smaller than the diameter of said wheel hub, to thereby form a spring clip adapted to be snapped over said hub.

4. An in-line (end-viewable) reflector assembly for attachment to a cycle wheel having a central hub, a radially spaced rim and a plurality of spokes converging from opposite sides of the hub to the rim to provide the support for the rim comprising a generally planar reflector, and mounting means for attaching said reflector to said wheel to lie wholly within the internal protected space generated by the spokes of said wheel and in a plane parallel to the hub axis, said reflector conforming generally in shape to at least a radially inward portion of the generally trapezoidal shaped are a formed by the intersection of said plane and said protected space, and said reflector extending substantially the entire distance across said space from one side to the other, said mounting means comprising a spring metal base plate supporting said reflector, said base plate having at its inner end a curved portion conforming generally to said wheel hub but having an opening slightly smaller than the diameter of said wheel hub, to thereby form a spring clip adapted to be snapped over said hub, and said base plate having a laterally protruding spoke clamp at its radially outer end.

5. An in-line (end-viewable) reflector assembly for attachment to a cycle wheel having a central hub, a radially spaced rim and a plurality of spokes converging from opposite sides of the hub to the rim to provide the support for the rim comprising two generally planar reflectors, and mounting means for attaching said reflectors to said wheel to lie wholly within the internal protected space generated by the spokes of said wheel and in a plane parallel to the hub axis, said reflectors conforming generally in shape to at least a radially inward portion of the generally trapezoidal shaped area formed by the intersection of said plane and said protected space, and said reflectors extending substantially the entire distance across said space from one side to the other, said mounting means comprising a spring metal base plate supporting said reflectors at opposite ends thereof, said base plate having an intermediate portion adapted to bear against the hub of said wheel, said base plate having laterally protruding spoke clamps at its radially opposite ends, the said base plate having a normal unstressed position in which its said two ends form an obtuse angle and being adapted to be stressed to a straight position and retained in said straight position by attachment of said spoke clamps to 180° opposed spokes.

6. The assembly of claim 5 wherein said intermediate portion of said base plate has a curved portion conforming generally to said wheel hub but having an opening slightly smaller than the diameter of said wheel hub, to thereby form a spring clip adapted to be snapped over said hub.

7. An in-line (end-viewable) reflector assembly for attachment to a cycle wheel having a central hub, a radially spaced rim and a plurality of spokes converging from opposite sides of the hub to the rim to provide the support for the rim comprising a generally planar reflector, and mounting means for attaching said reflector to said wheel to lie wholly within the internal protected space generated by the spokes of said wheel and in a plane parallel to the hub axis, said reflector conforming generally in shape to at least a radially inward portion of the generally trapezoidal shaped area formed by the intersection of said plane and said protected space, and said reflector extending substantially the entire distance across said space from one side to the other, said mounting means comprising a spring metal base plate supporting said reflector, said base plate having at its inner end a curved portion conforming generally to said wheel hub but having an opening slightly smaller than the diameter of said wheel hub, to thereby form a spring clip adapted to be snapped over said hub, and said mounting means also comprising a laterally protruding spoke clamp at its radially outer end.

8. An in-line (end-viewable) reflector assembly for attachment to a cycle wheel having a central hub, a radially spaced rim and a plurality of spokes converging from opposite sides of the hub to the rim to provide the support for the rim comprising two generally planar reflectors, and mounting means for attaching said reflectors to said wheel to lie wholly within the internal protected space generated by the spokes of said wheel and in a plane parallel to the hub axis, said reflectors conforming generally in shape to at least a radially inward portion of the generally trapezoidal shaped area formed by the intersection of said plane and said protected space, and said reflectors extending substantially the entire distance across said space from one side to the other, said mounting means comprising a spring metal base plate supporting said reflectors at opposite ends thereof, said base plate having an intermediate portion adapted to bear against the hub of said wheel, said mounting means also comprising laterally protruding spoke clamps at its radially opposite ends, the said base plate having a normal unstressed position in which its said two ends form an obtuse angle and being adapted to be stressed to a straight position and retained in said straight position by attachment of said spoke clamps to 180° opposed spokes.

* * * * *